US009560407B2

(12) United States Patent
Noble

(10) Patent No.: US 9,560,407 B2
(45) Date of Patent: Jan. 31, 2017

(54) SYSTEMS AND METHODS FOR MANAGING PAIRING OF REMOTE CONTROL DEVICES WITH A PLURALITY OF MEDIA CONTENT PROCESSING DEVICES

(71) Applicant: Verizon Patent and Licensing Inc., Arlington, VA (US)

(72) Inventor: Taber B. Noble, Bedminster, NJ (US)

(73) Assignee: VERIZON PATENT AND LICENSING INC., Basking Ridge, NJ (US)

( * ) Notice: Subject to any disclaimer, the term of this patent is extended or adjusted under 35 U.S.C. 154(b) by 86 days.

(21) Appl. No.: 14/633,058

(22) Filed: Feb. 26, 2015

(65) Prior Publication Data

US 2016/0255391 A1    Sep. 1, 2016

(51) Int. Cl.
*H04N 21/422* (2011.01)
*H04N 21/436* (2011.01)
(Continued)

(52) U.S. Cl.
CPC ...... *H04N 21/42221* (2013.01); *H04N 5/4403* (2013.01); *H04N 21/42222* (2013.01);
(Continued)

(58) Field of Classification Search
CPC ............ G08C 2201/91; G08C 2201/92; G08C 2201/93; H03J 2200/22; H03J 2200/23; H03J 2200/24; H03J 2200/25; H03J 2200/26; H04N 2005/4405; H04N 2005/4407; H04N 2005/4408; H04N 2005/441; H04N 2005/4412; H04N 2005/4414; H04N 21/436; H04N 21/43607; H04N 21/43615; H04N 21/43622; H04N 21/4363; H04N 21/43632; H04N 21/43635; H04N 21/43637; H04N 21/4367; H04L 7/00; G06K 19/0723
See application file for complete search history.

(56) References Cited

U.S. PATENT DOCUMENTS

| | | | |
|---|---|---|---|
| 6,529,556 B1 * | 3/2003 | Perdue | G08C 15/06 341/176 |
| 2012/0242455 A1 * | 9/2012 | Hale | G08C 17/02 340/10.1 |

(Continued)

*Primary Examiner* — Benjamin R Bruckart
*Assistant Examiner* — Anthony Bantamoi

(57) ABSTRACT

An exemplary method includes a remote control device management system pairing a remote control device with a first media content processing device; detecting, after the pairing of the remote control device with the first media content processing device, that a second media content processing device receives an infrared ("IR") signal transmitted from the remote control device together with a non-infra-red ("non-IR") based wireless communication signal; determining that the remote control device is not paired with the second media content processing device by determining that the IR signal received by the second media content processing device includes an IR token that identifies the remote control device as being paired with the first media content processing device; and re-pairing, in response to the determination, the remote control device with the second media content processing device in place of the first media content processing device. Corresponding systems and methods are also described.

20 Claims, 13 Drawing Sheets

(51) Int. Cl.
 *H04N 5/44* (2011.01)
 *H04N 21/443* (2011.01)
(52) U.S. Cl.
 CPC ... *H04N 21/43615* (2013.01); *H04N 21/4433* (2013.01); *H04N 2005/4426* (2013.01)

(56) References Cited

U.S. PATENT DOCUMENTS

| | | | |
|---|---|---|---|
| 2013/0057778 A1* | 3/2013 | Hale | H04N 21/42207 348/734 |
| 2014/0267934 A1* | 9/2014 | Hardin | H04N 21/654 348/734 |
| 2016/0021485 A1* | 1/2016 | Sallas | H04W 4/008 455/41.3 |

* cited by examiner

SYSTEMS AND METHODS FOR MANAGING PAIRING OF REMOTE CONTROL DEVICES WITH A PLURALITY OF MEDIA CONTENT PROCESSING DEVICES

BACKGROUND INFORMATION

Subscription television service users often have multiple set-top box devices located throughout their homes. For example, a user may have a different set-top box device for each television located within the user's home. In this manner, the user may access media programs or otherwise interact with the subscription television service regardless of which television he or she is viewing.

Each set-top box device included in a plurality of set-top box devices located in a user's home may be paired with a different remote control device. Through a remote control device, a user is able to control a set-top box device that is paired with the remote control device, but is not able to control other set-top box devices located in the home of the user.

However, the user may desire or need to use a remote control device to control a set-top box device other than the set-top box device that is currently paired with the remote control device. For example, a remote control device may be paired with a first set-top box device located in a first room at a user's house. In some cases, the user may want to carry the remote control device from the first room to a second room in order to use the remote control device to control a second set-top box device located in the second room (e.g., if the remote control device currently paired with the second set-top box device is lost). Unfortunately, the user will not be able to control the second set-top box device because the remote control device is currently paired with the first set-top box device, not the second set-top box device. This undesirably results in the second set-top box device not recognizing a command that is sent from the remote control device and that is intended to control the second set-top box device. In addition, if the remote control device uses BLUETOOTH or other non-infrared based wireless signals, this may result in the command intended to control the second set-top box device undesirably being executed by the first set-top box device.

BRIEF DESCRIPTION OF THE DRAWINGS

The accompanying drawings illustrate various embodiments and are a part of the specification. The illustrated embodiments are merely examples and do not limit the scope of the disclosure. Throughout the drawings, identical or similar reference numbers designate identical or similar elements.

DETAILED DESCRIPTION OF PREFERRED EMBODIMENTS

Figure 1:
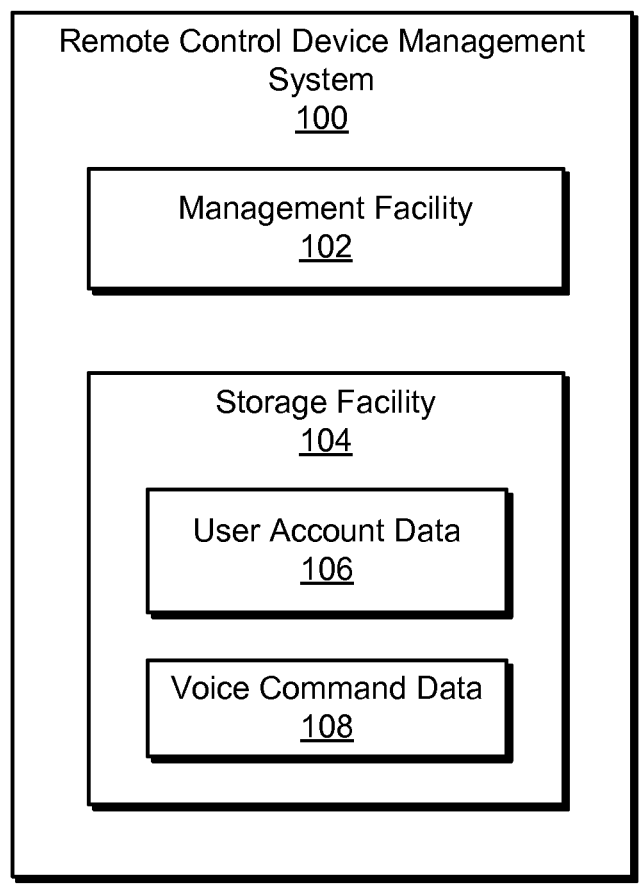
FIG. 1 illustrates an exemplary remote control device management system according to principles described herein.

Exemplary systems and methods for managing pairing of remote control devices with a plurality of media content processing devices are disclosed herein. For example, a remote control device management system may pair a remote control device with a first media content processing device included in a plurality of media content processing devices associated with a user account. The remote control device may be configured to control media content processing devices with non-infrared-based ("non-IR-based") wireless communication signals. The pairing may comprise providing the remote control device with an infrared token ("IR token") that identifies the remote control device as being paired with the first media content processing device and that is to be transmitted by the remote control device within an infrared signal ("IR signal") each time the remote control device transmits a non-IR-based wireless communication signal.

After the pairing of the remote control device with the first media content processing device, the remote control device management system may detect that a second media content processing device included in the plurality of media content processing devices receives the IR signal transmitted from the remote control device together with the non-IR based wireless communication signal. The remote control device management system may determine that the remote control device is not paired with the second media content processing device by determining that the IR signal received by the second media content processing device includes the IR token that identifies the remote control device as being paired with the first media content processing device. In response to the determination, the remote control device management system may re-pair the remote control device with the second media content processing device in place of the first media content processing device.

The systems and methods described herein may facilitate dynamically re-pairing a remote control device with a media content processing device (e.g., a set-top box device) that was not originally paired with the remote control device. For example, a user may move a remote control device that is paired with a first media content processing away from a vicinity of the first media content processing device (e.g., by leaving a room in which the first media content processing device is located). The user may subsequently attempt to use the remote control device to transmit an input command to a second media content processing device while in a vicinity of the second media content processing device (e.g., by selecting one or more buttons on the remote control device while in a room in which the second media content processing device is located). In response, the remote control device may transmit both a non-IR-based wireless communication signal that includes the input command (e.g., a BLUETOOTH signal that includes the input command) and an IR signal that includes an IR token that identifies the remote control device as being paired with the first media content processing device. The remote control device management system may detect that the second media content processing device receives the IR signal and accordingly determine that the second media content processing device is not paired with the remote control device. Based on the determination, the remote control device management system may re-pair the remote control device with the second media content processing device such that the remote control device is no longer paired with the first media content processing device. Various ways in which the remote control device management system may re-pair the remote control device with the second media content processing device will be described herein.

Various benefits may be realized in accordance with the systems and methods described herein. For example, the systems and methods described herein may enable the dynamic re-pairing of a remote control device with a media content processing device on-the-fly and with either minimal or no input from the user. In addition, by facilitating re-pairing of a remote control device with a media content processing device, the systems and methods described herein may effectively prevent a command entered by way of the remote control device from being transmitted to and executed by a different media content processing device than intended by the user. These and/or additional or alternative benefits that may be provided by exemplary systems and methods described herein will be made apparent by the following description. Exemplary systems and methods for managing pairing of remote control devices with a plurality of media content processing devices will now be described with reference to the accompanying drawings.

FIG. 1 illustrates an exemplary remote control device management system 100 (or simply "system 100"). As shown, system 100 may include, without limitation, a management facility 102 and a storage facility 104 selectively and communicatively coupled one to another. Facilities 102 and 104 may be coupled to one another by any suitable communication technologies.

It will be recognized that although facilities 102 and 104 are shown to be separate facilities in FIG. 1, any of those facilities may be combined into a single facility or split into additional facilities as may serve a particular implementation. Additionally or alternatively, one or more of the facilities 102 and 104 may be omitted from and external to system 100 in other implementations. Facilities 102 and 104 will now be described in more detail.

Storage facility 104 may be configured to store user account data 106 representative of any data that may be associated with a user account (e.g., data defining pairings of remote control devices with respective media content processing devices) and voice command data 108 representative of one or more voice commands that may be entered by way of a remote control device described herein. Storage facility 104 may maintain additional or alternative data as may serve a particular implementation.

Management facility 102 may perform various remote control device management operations. For example, management facility 102 may manage pairing between a plurality of remote control devices and a plurality of media content processing devices located at a user premises (e.g., a home, a business, etc.) of a user. To this end, management facility 102 may maintain information specifying which media content processing device each of the plurality of remote control devices is paired with and update that information based on certain actions of a user of the remote control devices. Specific examples of how management facility 102 may manage the pairing of remote control devices and media content processing devices at a user premises are provided herein.

A remote control device as described herein may include any device capable of communicating with a media content processing device by way of both an IR signal and a non-IR-based wireless communication signal. At any given time, a remote control device may be paired with only one media content processing device. However, a plurality of remote control devices may be paired with the same media content processing device at a given time.

In some examples, the remote control device may include a dedicated remote control device that has no other function than to control an operation of a media content processing device and/or one or more devices (e.g., a television, a digital video disc ("DVR") player device, a BLU-RAY DISC ("BD") player device, etc.) that are communicatively coupled to the media content processing device. The remote control device may have a plurality of distinct buttons disposed on the surface thereof. At least some of the physically distinct buttons may, as will be described in more detail below, be configured to facilitate dynamically re-pairing the remote control device with another media content processing device included in the plurality of media content processing devices.

Additionally or alternatively, the remote control device may include a mobile computing device (e.g., a mobile phone device, a tablet computer, etc.) configured to emulate a dedicated remote control device. For example, a mobile computing device may execute an application configured to emulate a dedicated remote control device by displaying graphical representations of one or more buttons associated with the dedicated remote control device on a display screen of the mobile computing device.

The remote control device may be configured to control a media content processing device with the non-IR-based wireless communication signals. As used herein, a "non-IR-based wireless communication signal" may include any wireless communication signal other than an IR signal that may be used to transmit a command from a remote control device to a media content processing device paired with the remote control device. For example, the non-IR-based wireless communication signal may include a radio frequency ("RF") signal, a BLUETOOTH signal, a Wi-Fi signal, and/or any other suitable wireless communications signal as may serve a particular implementation. The non-IR-based wireless communication signal may include data representative of a command provided by the remote control device in response to user input. In certain examples, the non-IR-based wireless communication signal may also include coding information (e.g., a non-IR-based wireless communication token) and/or any other suitable information that may facilitate communication between the remote control device and a paired media content processing device.

Additionally, the remote control device may be configured to transmit IR signals to a media content processing device and/or one or more other devices (e.g. a television, a DVD player device, a BD player device, etc.). For example, the remote control device may include an IR transmitter that facilitates line-of-sight transmission of an IR signal to be received by an IR receiver of a media content processing device and/or one or more other devices communicatively coupled to the media content processing device. In operation, the remote control device may be configured to transmit an IR signal each time the remote control device transmits a non-IR-based wireless communication signal. Specific examples of how a remote control device may transmit an IR signal together with a non-IR-based wireless communication signal are provided herein.

In certain examples, the remote control device may include a memory in which certain information associated with a pairing of the remote control device with a media content processing device may be stored. Any suitable information may be stored in the memory of the remote control device. For example, such information may include coding information that may be used to identify and control one or more devices that are communicatively coupled to the media content processing device. The memory of the remote control device may include, for example, IR codes that facilitate the remote control device identifying and controlling the one or more devices. Additionally or alternatively, such information may include information associated with recent input commands provided by way of the remote control device. Any other suitable information may be stored in the memory of the remote control device as may suit a particular implementation.

As used herein, a "media content processing device" may include any device that may communicate with a remote control device and facilitate presenting certain media content to a user. For example, a media content processing device may include, but is not limited to, a set-top box device, a digital video recording ("DVR") device, a multi-room DVR device, a television, a personal computer, a laptop computer, a gaming system, and/or any device configured to facilitate access to one or more forms of media content. As used herein, the term "media content" may refer to a television program, on-demand media program, pay-per-view media program, broadcast media program (e.g., broadcast television program), multicast media program (e.g., multicast television program), narrowcast media program (e.g., narrowcast video-on-demand program), IPTV media program, advertisement, video, movie, audio program, radio program, and/or any other media content that may be presented by a media content processing device.

In certain examples, management facility 102 may pair a remote control device with a media content processing device included in a plurality of media content processing devices associated with a user account of a user (e.g., a plurality of media content processing devices located at a user premises of a user). Management facility 102 may pair the remote control device with the media content processing device in any suitable manner. For example, management facility 102 may pair a remote control device to a media content processing device by generating an infrared token ("IR token") that is unique to the pairing. Management facility 102 may generate the IR token in any suitable manner and the IR token may have any suitable form.

In certain examples, management facility 102 may provide the remote control device with the IR token that identifies the remote control device as being paired with a first media content processing device. Management facility 102 may provide the IR token to the remote control device in any suitable manner. For example, management facility 102 may direct the first media content processing device to provide the IR token to the remote control device by way of a non-IR-based wireless communication signal. The remote control device may store the IR token locally in the memory of the remote control device and transmit the IR token within an IR signal each time the remote control device transmits a non-IR-based wireless communication signal configured to control an operation of a media content processing device.

In certain examples, management facility 102 may also provide the remote control device with coding information used to identify and control one or more devices communicatively coupled to the first media content processing device. Management facility 102 may provide the coding information to the remote control device in any suitable manner. For example, management facility 102 may direct the first media content processing device to provide the coding information to the remote control device by way of a non-IR-based wireless communication signal. The remote control device may store the coding information locally in the memory of the remote control device and use the coding information to control the one or more devices communicatively coupled to the first media content processing device.

In certain examples, management 102 facility may facilitate setting up a pairing profile (e.g., as part of user account data 106) that includes information regarding which remote control device(s) are paired with each of the plurality of media content processing devices associated with a user account. Management facility 102 may facilitate the setting up of the pairing profile in any suitable manner. For example, management facility 102 may provide one or more graphical user interfaces for display on a display screen of a display device associated with one of the plurality of media content processing devices located at the user premises. Through the one or more graphical user interfaces, a technician and/or a user may provide information associated with a plurality of entries that represent pairings between remote control devices and media content processing devices. Such information may be provided as part of and/or subsequent to an initial configuration of the user account.

Each entry included in the pairing profile may include information specifying a pairing between a media content processing device and a particular remote control device. For example, the pairing profile may specify that a first remote control device is paired with a first media content processing device, a second remote control device is paired with a second media content processing device, a third remote control device is paired with a third media content processing device, etc. The pairing profile may also include information defining IR tokens that are generated by management facility 102 and that are unique to each pairing. For example, the pairing profile may include a first IR token that is unique to the pairing of the first remote control device with the first media content processing device, a second IR token that is unique to the pairing of the second remote control device to the second media content processing device, a third IR token that is unique to the pairing of the third remote control device with the third media content processing device, etc. The pairing profile may also include information describing a location of each of the plurality of media content processing devices at the user premises, coding information for identifying and controlling one or more other devices communicatively coupled to each of the media content processing devices, and/or any other suitable information.

Figure 2:
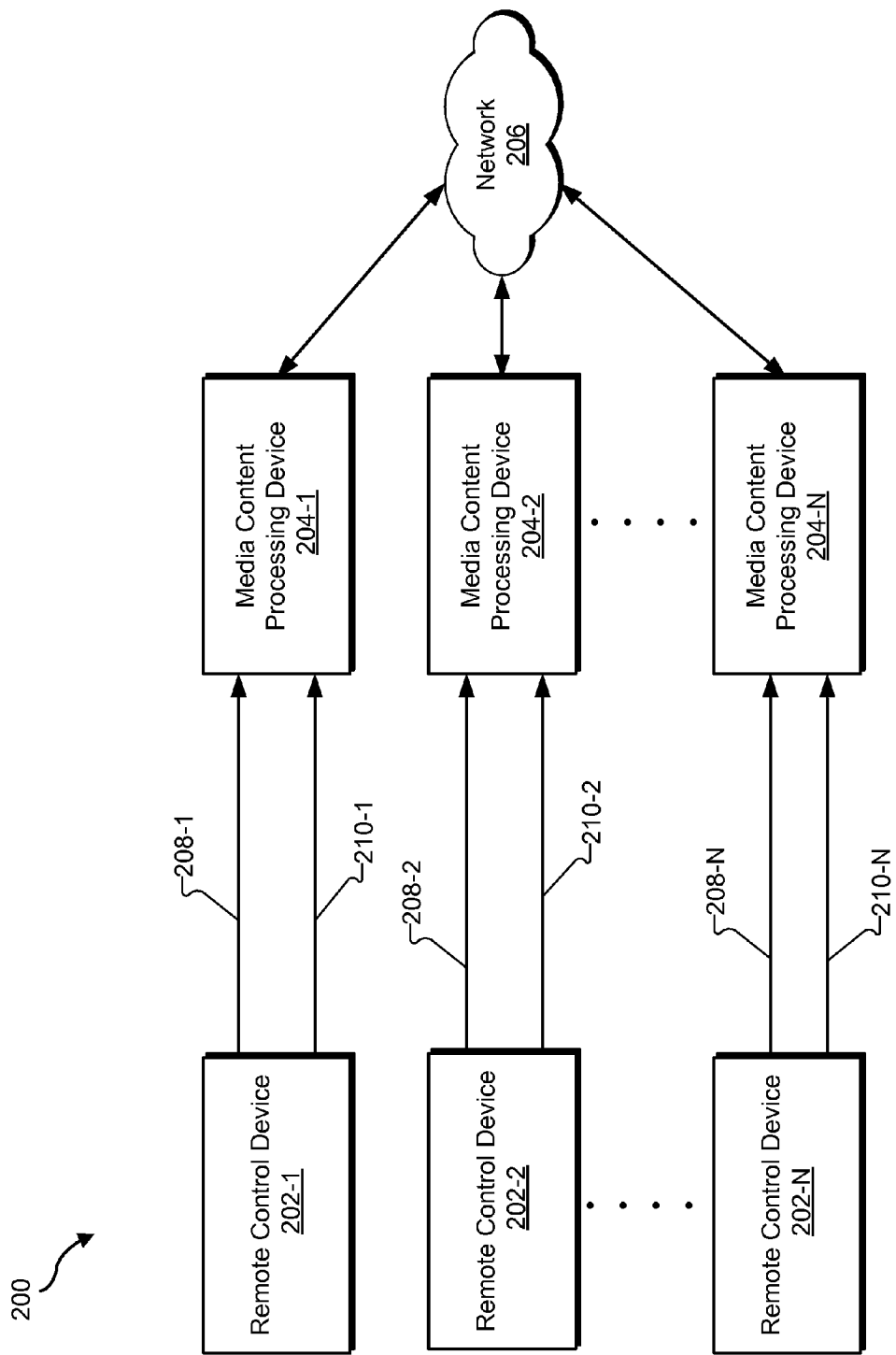
FIGS. 2-4 illustrate exemplary implementations of the system of FIG. 1 according to principles described herein.

To illustrate, FIG. 2 shows an exemplary implementation 200 in which a plurality of remote control devices are paired respectively to a plurality of media content processing devices. As shown in FIG. 2, a plurality of remote control devices 202 (e.g., remote control devices 202-1 through 202-N) are respectively paired with a plurality of media content processing devices 204 (e.g., media content processing devices 204-1 through 204-N) (or simply "processing devices 204"). Each processing device 204 may be connected to a network 206 and configured to communicate with the other processing devices 204 by way of network 206. Network 206 may include a local area network (e.g., a Wi-Fi network) and/or any other type of network as may serve a particular implementation. Processing devices 204 may communicate by way of network 206 through any suitable communication protocol, such as described herein.

The example shown in FIG. 2 illustrates a one-to-one relationship between paired remote control devices 202 and processing devices 204. That is, remote control device 202-1 is paired with processing device 204-1, remote control device 202-2 is paired with processing device 204-2, and remote control device 202-N is paired with processing device 204-N. A particular remote control device 202 may only be paired with one processing device 204 at a time. However, as noted above, in certain examples, more than one remote control device 202 may be paired with a particular processing device 204 at a given time.

As shown in FIG. 2, remote control devices 202 may communicate with corresponding paired processing devices 204 by way of both IR signals 208 (e.g., IR signals 208-1 through 208-N) and non-IR-based wireless communication signals 210 (e.g., non-IR-based wireless communication signals 210-1 through 210-N). For example, a user may provide a user input command by way of remote control device 202-1 for processing device 204-1 to change the media content currently being presented to the user (e.g., by changing a channel). In response, remote control device 202-1 may transmit both IR signal 208-1 including an IR token and non-IR-based wireless communication signal 210-1 including the command to processing device 204-1. Management facility 102 may detect that remote control device 202-1 transmitted IR signal 208-1 along with an IR token to processing device 204-1 through, for example, an IR sensor associated with processing device 204-1. Management facility 102 may then confirm that the IR token indicates that remote control device 201-1 is paired with processing device 204-1 and may direct processing device 204-1 to execute the command included in non-IR-based wireless communication signal 210-1.

After management facility 102 pairs a remote control device with a first media content processing device, a user of the remote control device may attempt to control a second media content processing device that is not currently paired with the remote control device. The user may want to use the remote control device to control the second media content processing device for any suitable reason. For example, the batteries of an additional remote control device paired with the second media content processing device may be dead. Alternatively, the additional remote control device that is paired with the second media content processing device may be misplaced. Accordingly, the user may move the remote control device to a vicinity associated with the second media content processing device. While in the vicinity of the second media content processing device, the user may input a command by way of the remote control device in an attempt to control the second media content processing device.

Figure 3:
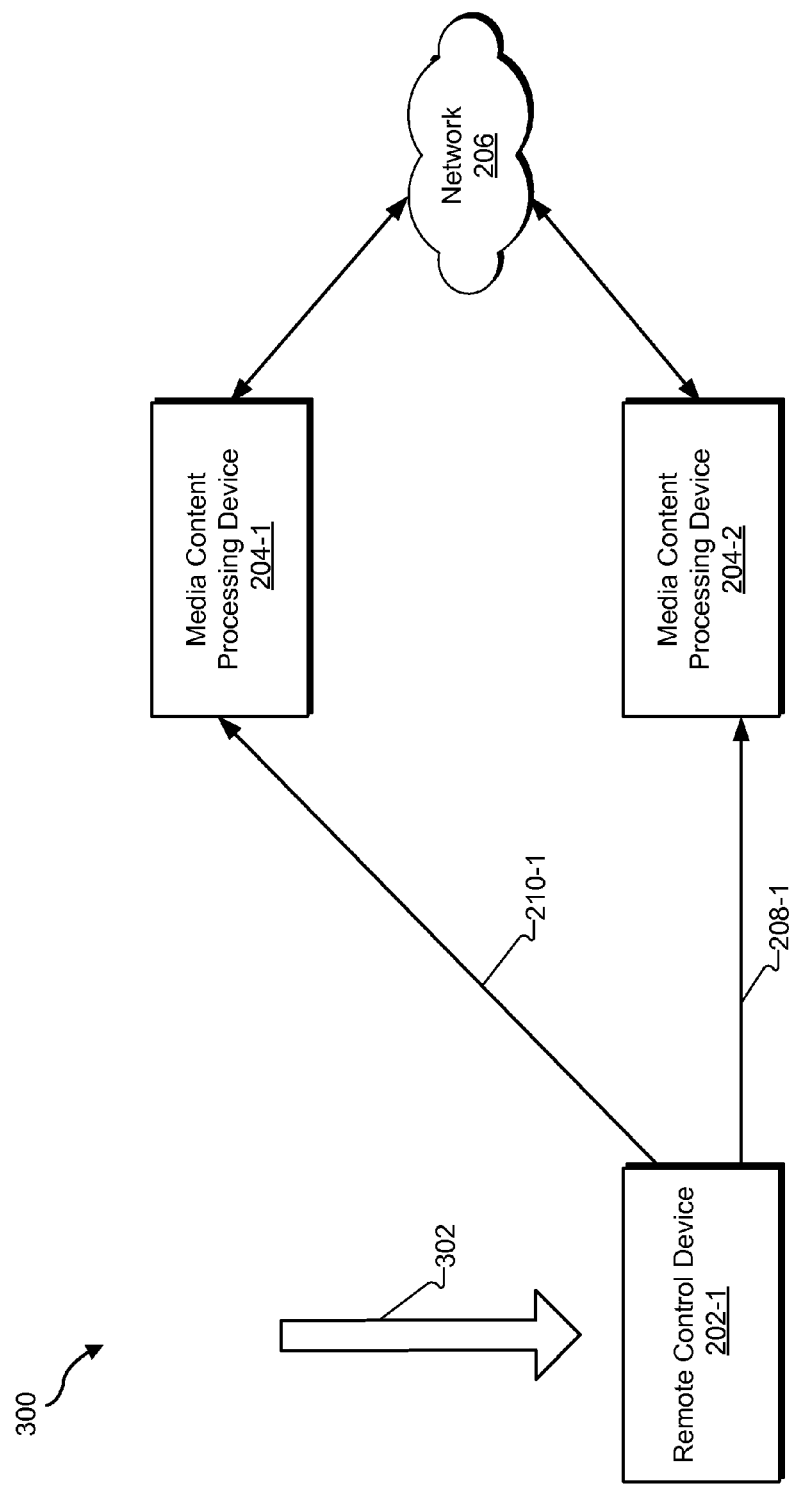

To illustrate, FIG. 3 shows an exemplary implementation 300 in which a user is attempting to control processing device 204-2 with remote control device 202-1. As shown in FIG. 3, arrow 302 is indicative of a movement of remote control device 202-1 from a vicinity associated with processing device 204-1 to a vicinity associated with processing device 204-2. The attempt to control processing device 204-2 may include remote control device 202-1 transmitting IR signal 208-1 to processing device 204-2. However, because remote control device 202-1 is currently paired with processing device 204-1, processing device 204-2 will not recognize and execute a command that is associated with the user's attempt to control processing device 204-2 and that is included in non-IR-based wireless communication signal 210-1. In addition, in certain circumstances, as will be described below, remote control device 202-1 may still be within a non-IR-based wireless communication range of processing device 204-1 when remote control device 202-1 transmits IR signal 208-1 and non-IR-based wireless communication signal 210-1. If remote control device 202-1 is within the non-IR-based wireless communication range of processing device 204-1, non-IR-based wireless communication signal 210-1 and the command associated with the user's attempt to control processing device 204-2 may be sent to processing device 204-1 instead of the intended processing device 204-2. This may result in processing device 204-1 undesirably executing the command instead of processing device 204-2.

To prevent such an occurrence, management facility 102 may detect that processing device 204-2 receives IR signal 208-1 transmitted from remote control device 202-1. Management facility 102 may detect the receipt of IR signal 208-1 by processing device 204-2 in any suitable manner. For example, management facility 102 may utilize an IR sensor associated with processing device 204-2 to detect IR signal 208-1.

Based on the detected IR signal 208-1, management facility 102 may determine that remote control device 202-1 is not paired with processing device 204-2. This may be accomplished in any suitable manner. For example, management facility 102 may detect the IR token included in IR signal 208-1. Management facility 102 may access the pairing profile and determine that the IR token received by processing device 204-2 specifies that remote control device 202-1 is paired with processing device 204-1.

Figure 4:
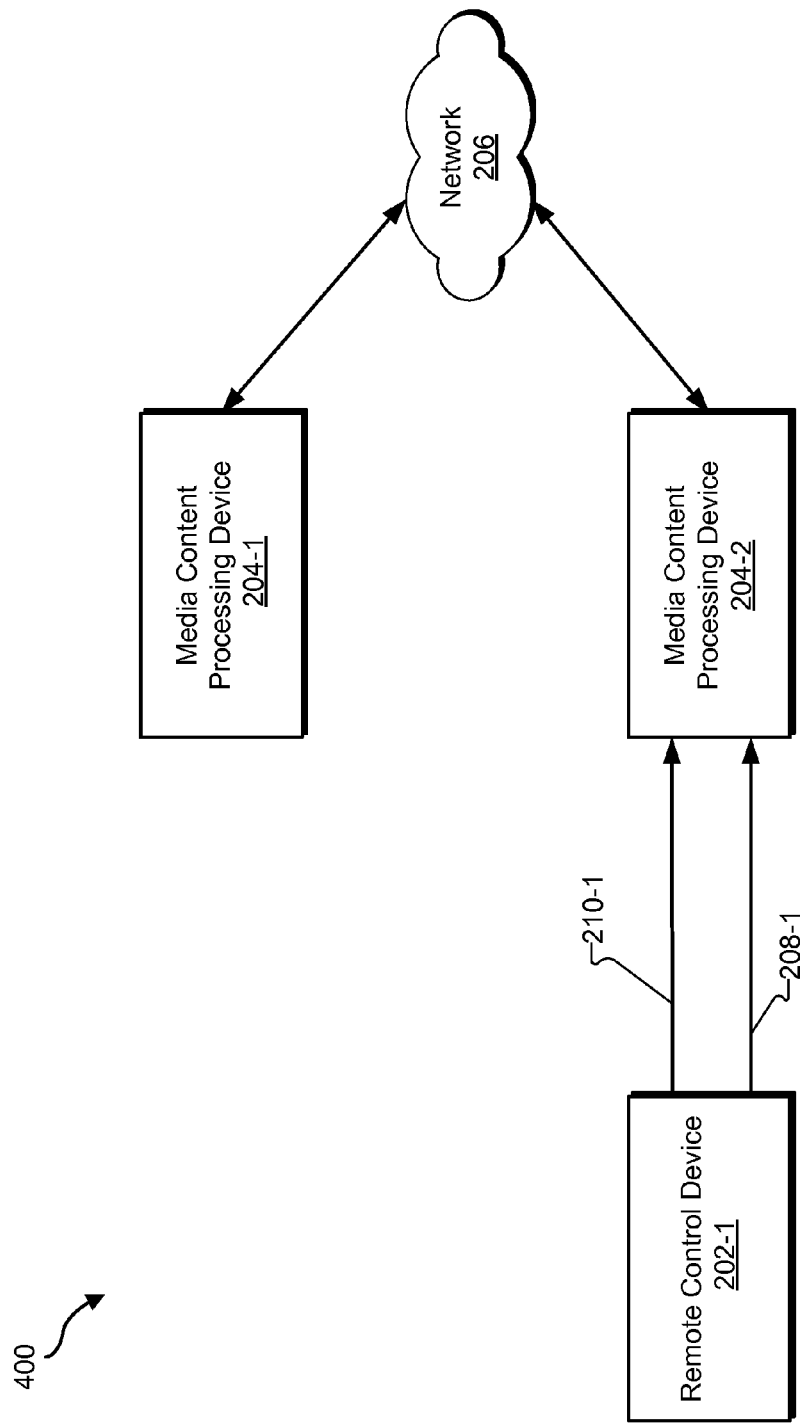

In response to the determination that remote control device 202-1 is paired with processing device 204-1, management facility 102 may re-pair remote control device 202-1 with processing device 204-2 in place of processing device 204-1. This may be accomplished in any suitable manner. For example, management facility 102 may generate, in any suitable manner, an updated IR token that is unique to the pairing of remote control device 202-1 with processing device 204-2. Management facility 102 may update the pairing profile with the updated IR token to specify that remote control device 202-1 is paired with processing device 204-2 in place of processing device 204-1. Management facility 102 may then provide the updated IR token to remote control device 201-1 in any suitable manner, such as described herein. Remote control device 202-1 may store the updated token in a memory of remote control device 202-1 to be transmitted with future IR signals. In this regard, management facility 102 may effectively un-pair remote control device 202-1 from processing device 204-1 such that remote control device 202-1 is only paired with processing device 204-2. To illustrate, FIG. 4 shows an exemplary implementation 400 in which remote control device 202-1 has been re-paired with processing device 204-2 such that both IR signal 208-1 and non-IR-based wireless communication signal 210-1 are now provided to processing device 204-2.

In certain examples, management facility 102 may also provide updated coding information to a remote control device as part of the re-pairing of the remote control device with another media content processing device. Management facility 102 may provide the updated coding information to the remote control device in any suitable manner. For example, management facility 102 may direct a media content processing device to provide the updated coding information by way of a non-IR-based wireless communication signal. The updated coding information may be used, for example, to identify and control a display device communicatively coupled to a media content processing device.

To illustrate, in the example shown in FIG. 3, processing device 204-1 may be communicatively coupled to a first display device (not shown) that operates in accordance with a first set of coding information that may be used to control the first display device by way of IR signal 208-1. Processing device 204-2, on the other hand, may be communicatively coupled to a second display device (not shown) that operates in accordance with a second set of coding information that is different than the first set of coding information and that may be used to control the second display device by way of IR signal 208-1. Accordingly, management facility 102 may update the coding information stored in a memory of remote control device 202-1 during the re-pairing such that remote control device 202-1 has the appropriate coding information to control the second display device. In so doing, the systems and methods described herein may facilitate updating coding information stored in a remote control device on-the-fly and without requiring the user to manually enter the coding information.

In certain examples, management facility 102 may block a media content processing device from executing a command included in a non-IR based wireless communication signal transmitted from a remote control device. This may be accomplished in any suitable manner. For example, management facility 102 may determine which media content processing device is currently paired with the remote control device as a threshold requirement to executing a command included in the non-IR-based wireless communication signal. When management facility 102 determines that the remote control device that transmitted an IR signal is paired with a different media content processing device (e.g., by detecting the IR token), management facility 102 may prevent the currently paired media content processing device from executing the command included in the non-IR-based wireless communication signal. To illustrate, in the example shown in FIG. 3, management facility 102 may block processing device 204-1 from executing a command included in non-IR-based wireless communication signal 210-1 in response to detecting an IR token included in IR signal 208-1.

Subsequent to the re-pairing, management facility 102 may facilitate execution of the command by the media content processing device that has been re-paired with the remote control device. Management facility 102 may facilitate execution of the command in any suitable manner. For example, management facility 102 may facilitate execution of the command without a user of the remote control device having to re-enter a command associated with the non-IR-based wireless communication signal. In certain examples, management facility 102 may direct remote control device 202-1 to automatically retransmit a command by way of an additional non-IR-based wireless communication signal to processing device 204-2. Alternatively, management facility 102 may direct processing device 204-1 to automatically communicate the command to processing device 204-2 in any suitable manner, such as by way of network 206.

To illustrate, the command included in non-IR-based wireless communication signal 210-1 illustrated in FIG. 3 may be associated with a channel up input entered by way of remote control device 202-1 and intended to direct processing device 204-2 to change from a first channel to a second channel. After the re-pairing, management facility 102 may direct processing device 204-1 to communicate the channel up input to processing device 204-2 by way of network 206. Processing device 204-2 may receive the communicated channel up input from processing device 204-1 and automatically change from the first channel to the second channel without the user having to re-enter the channel up input on remote control device 202-1.

Figure 5:
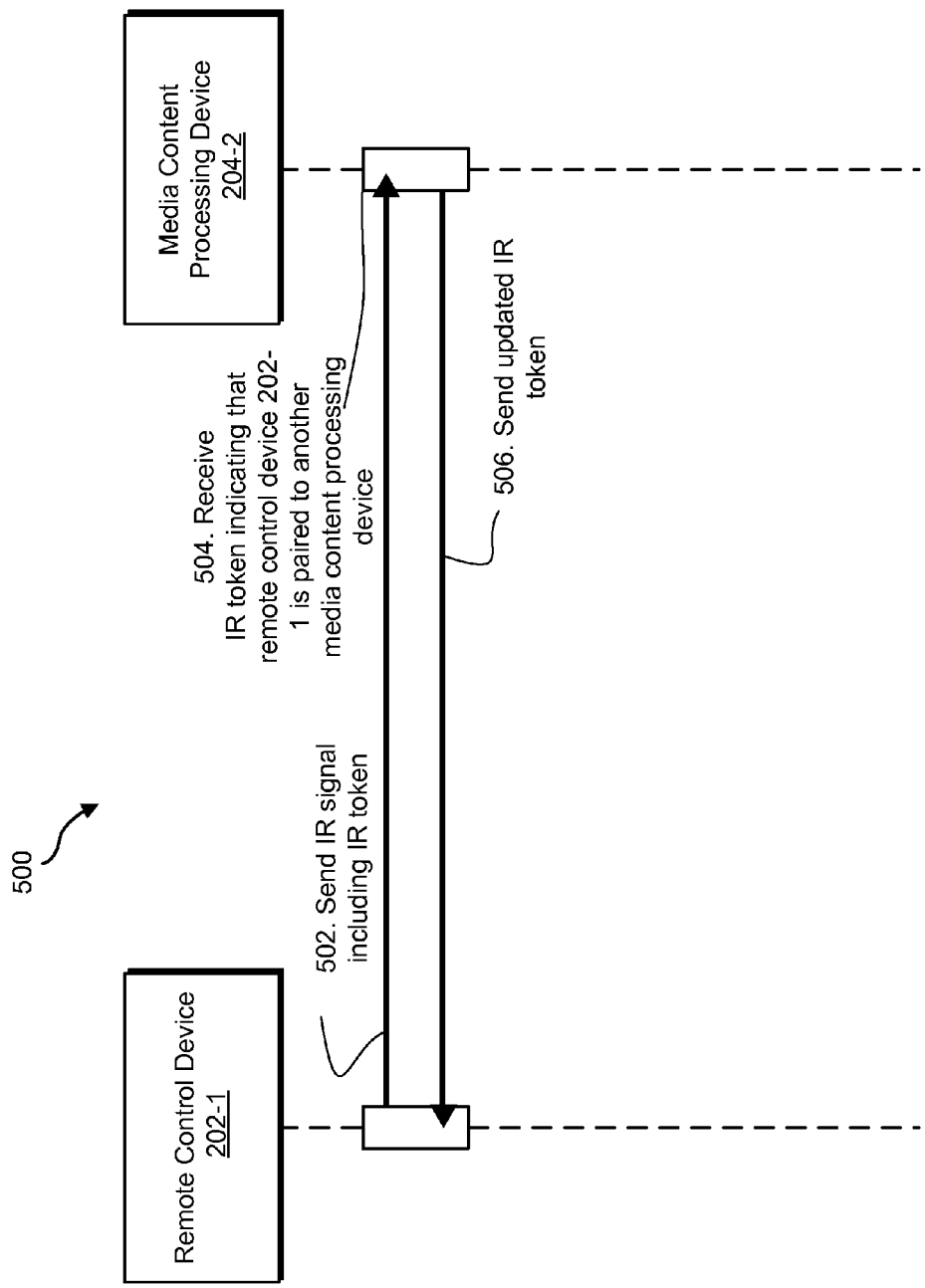
FIGS. 5-6 illustrate exemplary sequence diagrams according to principles described herein.

In certain examples, the re-pairing of a remote control device with another media content processing device may be transparent to a user of the remote control device. That is, management facility 102 may perform operations associated with the re-pairing such that the user is not aware of the operations. To illustrate, FIG. 5 depicts an exemplary sequence diagram 500 showing one example of how remote control device 202-1 may communicate with processing device 204-2 to facilitate re-pairing remote control device 202-1 with processing device 204-2. Arrow 502 represents a transmission of an IR signal including an IR token from remote control device 202-1 to processing device 204-2. Block 504 represents a receipt by processing device 204-2 of the IR token indicating that remote control device 202-1 is currently paired with another media content processing device. Arrow 506 represents sending of an updated IR token to remote control device 202-1 as part of the re-pairing of remote control device 202-1 to processing device 204-2. As described above, the updated IR token may be sent in any suitable manner such as by way of an additional non-IR-based wireless communication signal. Each step illustrated in sequence diagram 500 may occur automatically in response to the user's attempt to control processing device 204-2 and as a background process such that the user is not aware that the re-pairing has occurred.

The sequence illustrated in FIG. 5 indicates that the updated IR token is provided to remote control device 202-1 by processing device 204-2. However, in certain other examples, the updated IR token may be provided to a remote control device by another media content processing device (e.g., processing device 204-1 prior to the repairing) or from any other device.

Alternatively, management facility 102 may request confirmation from a user of a remote control device prior to the re-pairing of the remote control device with a second media content processing device. Management facility 102 may request the confirmation in any suitable manner. For example, management facility 102 may request the confirmation by way of any suitable graphical user interface provided for display on a display device (e.g., a television) associated with the second media content processing device. The user may then enter any suitable response by way of the remote control device to provide the confirmation. For example, the confirmation of the re-pairing may include the user pressing a button provided on the remote control device and/or providing a voice command. After management facility 102 receives the confirmation from the user, management facility 102 may re-pair the remote control device with the second media content processing device.

Figure 6:
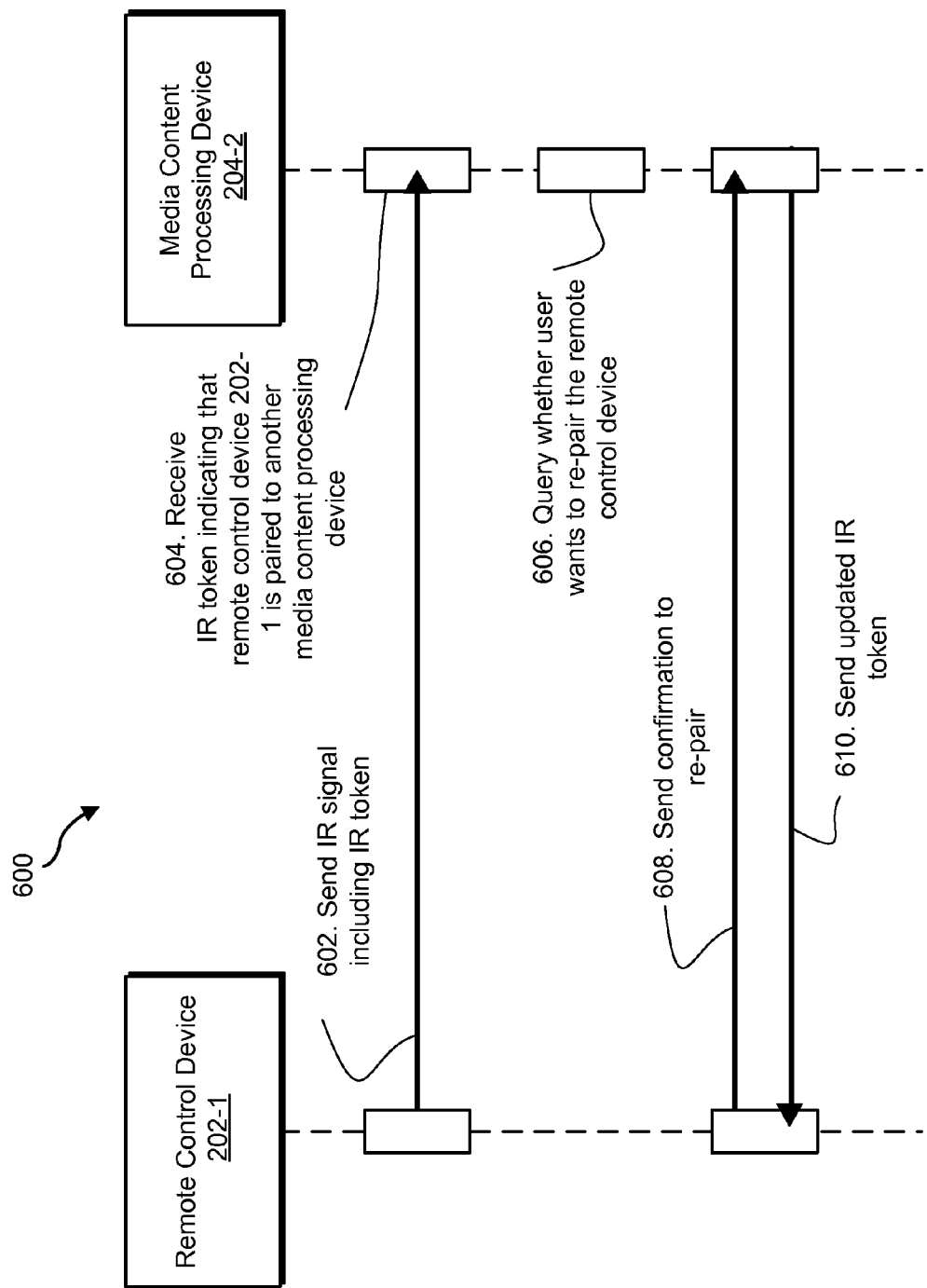

To illustrate, FIG. 6 depicts an exemplary sequence diagram 600 showing another example of how remote control device 202-1 may communicate with processing device 204-2 to facilitate re-pairing remote control device 202-1 with processing device 204-2. Arrow 602 represents a transmission of an IR signal including an IR token from remote control device 202-1 to processing device 204-2. Block 604 represents a receipt by processing device 204-2 of the IR token indicating that remote control device 202-1 is currently paired with another media content processing device. Box 606 represents a presentation of a query to the user to determine whether the user wants to re-pair remote control device 202-1 with processing device 204-2. Management facility 102 may present the query to the user and request confirmation for the re-pairing in any suitable manner, such as described herein. Arrow 608 represents a confirmation to re-pair sent from remote control device 202-1 to processing device 204-2. Arrow 610 represents the sending of an updated IR token to remote control device 202-1 as part of the re-pairing of remote control device 202-1 to processing device 204-2.

Management facility 102 may be configured to repeat one or more of the operations described above each time a user attempts to control a media content processing device with a remote control device that is not currently paired with that media content processing device. For example, after management facility 102 re-pairs remote control device 202-1 with processing device 204-2, the user may attempt to use remote control device 202-1 to again control processing device 204-1. In response to such an attempt, management facility 102 may repeat one or more of the operations described above to re-pair remote control device 202-1 with processing device 204-1 in place of processing device 204-2.

In certain implementations, the first media content processing device may be located in a first room at a user premises, and the second media content processing device may be located in a second room at the user premises. To illustrate, FIGS. 7 and 8 each show an exemplary user premises 700 having rooms 702 (e.g., 702-1 and 702-2). User premises 700 may correspond to any location where one or more processing devices may be located. For example, user premises 700 may correspond to a residence, a business, or any other structure that may be associated with a user.

Figure 7:
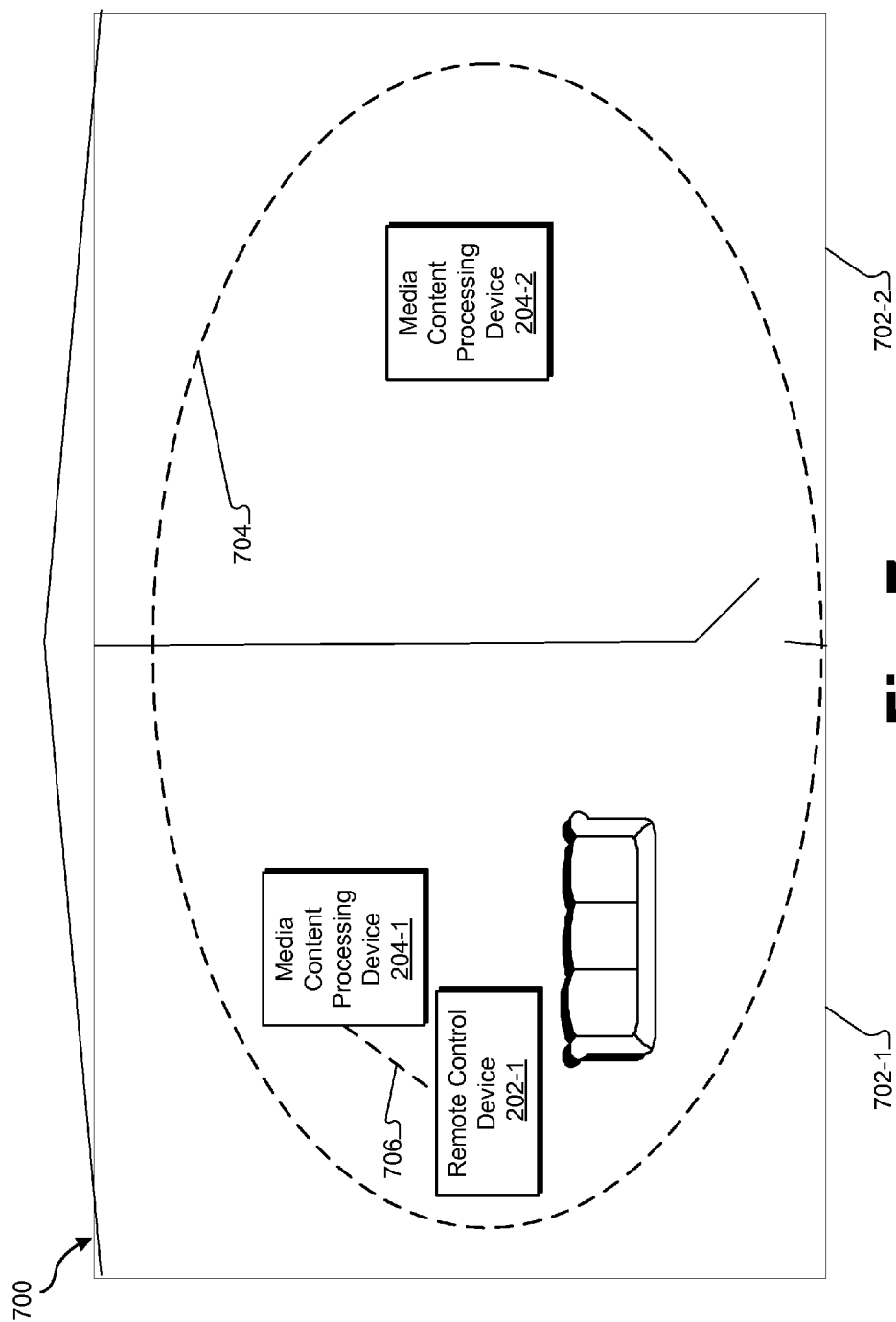
FIGS. 7-8 illustrate exemplary implementations showing a migration of a remote control device at a user premises according to principles described herein.

As shown in FIG. 7, remote control device 202-1 is located within a vicinity 704 of processing device 204-1. Vicinity 704 may include any suitable area and may be defined in any suitable manner. For example, as shown in FIG. 7, vicinity 704 may include a non-IR-based wireless communication range of processing device 204-1 (e.g., a BLUETOOTH communication range or a Wi-Fi communication range). That is, vicinity 704 may be defined by a maximum range at which a remote control device 202-1 may be located from processing device 204-1 and still communicate a non-IR-based wireless communication signal with processing device 204-1. Vicinity 704 may be defined in any other manner as may serve a particular implementation.

Figure 8:
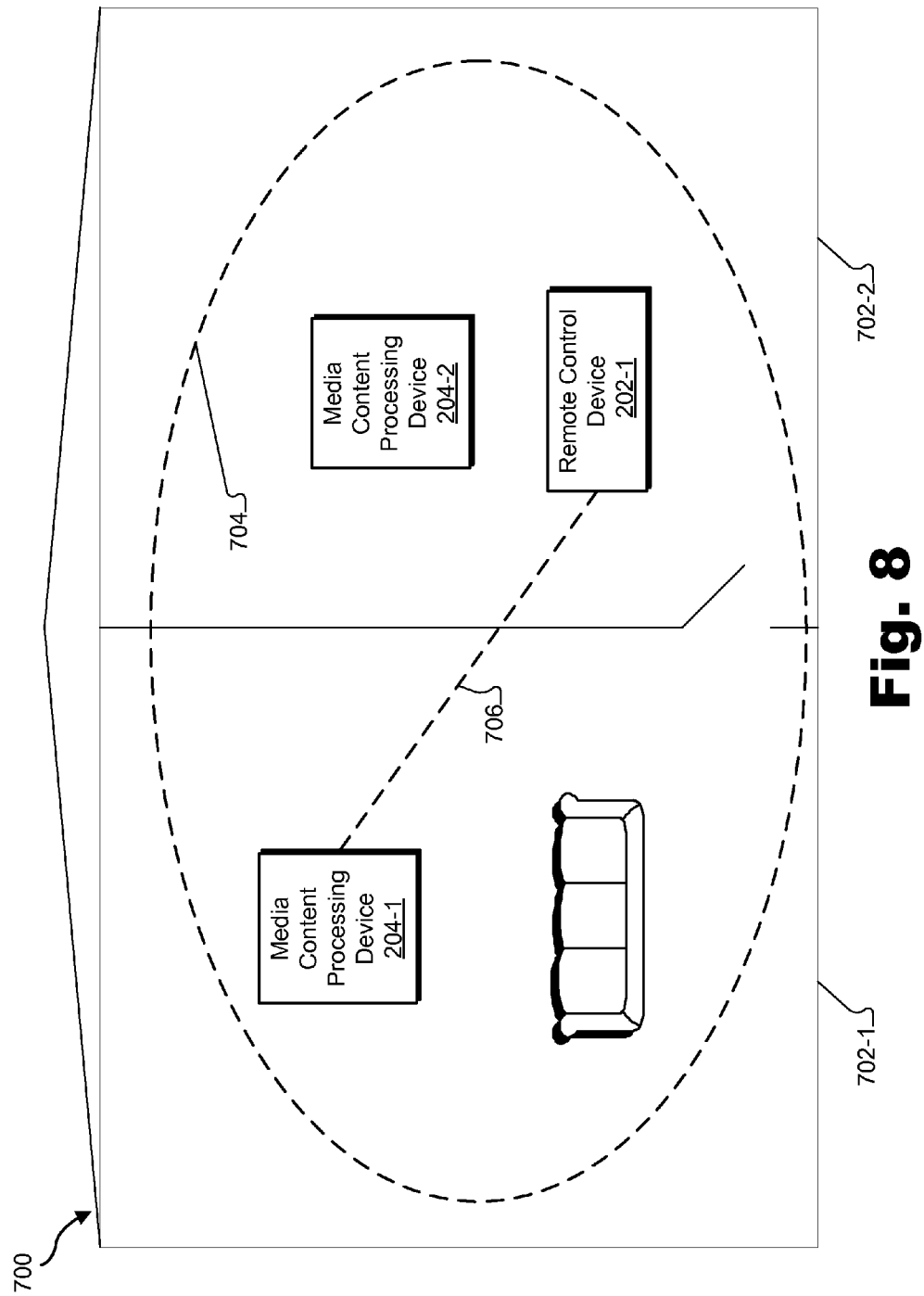

As shown in FIG. 7, remote control device 202-1 is initially located inside room 702-1, is paired with processing device 204-1 (as indicated by dashed line 706), and is within the boundaries of vicinity 704. A user may take remote control device 202-1 and walk or otherwise move to room 702-2, as shown in FIG. 8. While in room 702-2 the user may attempt to control processing device 204-2 with remote control device 202-1. For example, the user may enter any suitable input through remote control device 202-1 to access a program guide provided for display through a display device associated with processing device 204-2. However, because remote control device 202-1 is still paired with processing device 204-1 (as indicated by dashed line 706) and the remote control device 204-1 is still within vicinity 704, a non-IR-based wireless communication signal including the command to access the program guide may be received by processing device 204-1 while processing device 204-2 receives an IR signal from remote control device 202-1. Management facility 102 may determine that processing device 204-2 is not paired with remote control device 202-1 based on an IR token included in the IR signal. Based on this determination, management facility 102 may prevent processing device 204-1 from accessing the program guide and may facilitate re-pairing remote control device 202-1 with processing device 204-2 in place of processing device 204-1 in any suitable manner, such as described herein. After management facility 102 re-pairs remote control device 202-1 with processing device 204-2, management facility 102 may facilitate processing device 204-2 executing the command to access the program guide by, for example, directing processing device 204-1 to automatically communicate the command to processing device 204-2 by way of a network (e.g., network 206).

In certain examples, a user may take a remote control device and walk or otherwise move to an area that is outside of a non-IR-based wireless communication range of a first media content processing device that is paired with the remote control device. The user may then attempt to use the remote control device to control a second media content processing device that is outside of the non-IR-based wireless communication range of the first media content processing device. In such a circumstance, management facility 102 may detect that the second media content processing device receives an IR signal from the remote control device. However, the first media content processing device may not receive the non-IR-based wireless communication signal from the remote control device due to the remote control device being outside of the non-IR-based wireless communication range. In addition, the second media content processing device will not receive the non-IR-based wireless communication signal when the remote control device is paired with the first media content processing device. Accordingly, in such a circumstance, management facility 102 may designate the non-IR-based wireless communication signal as null and initiate the re-pairing process. Because the IR signal does not include a command associated with the user's attempt to control the second media content processing device, management facility 102 may facilitate the second media content processing device executing the command. For example, management facility 102 may direct the remote control device to automatically retransmit the command after the re-pairing without the user having to re-enter the command. Alternatively, management facility 102 may prompt the user, in any suitable manner, to re-enter the command after the re-pairing.

In certain examples, management facility 102 may be configured to facilitate a media content processing device operating in accordance with voice commands provided from a user by way of a remote control device. To this end, management facility 102 may maintain a voice command database that includes a plurality of pre-defined voice commands (e.g., as voice command data 108) that may be used by the user to control a media content processing device. The voice command database may include any suitable voice command. For example, the voice command database may include voice commands associated with names and/or locations of media content processing devices located at a user premises. Additionally, the voice command database may include other voice commands such as "yes" or "no" that may facilitate the user controlling a media content processing device.

Management facility 102 may detect a voice command provided by the user through the remote control device in any suitable manner. In certain examples, management facility 102 may detect the voice command by utilizing a microphone of the remote control device. Based on the detected voice command, management facility 102 may perform one or more remote control operations. For example, management facility 102 may access the voice command database and identify the voice command by comparing the voice command to the plurality of pre-defined voice commands. After management facility 102 identifies the voice command, management facility 102 may execute a pre-defined action based on the identified voice command. The pre-defined action may include any suitable action that may be performed by management facility 102. For example, a pre-defined action may include management facility 102 re-pairing a first remote control device with a second media content processing device in place of a first media content processing device based on the voice command.

Figure 9:
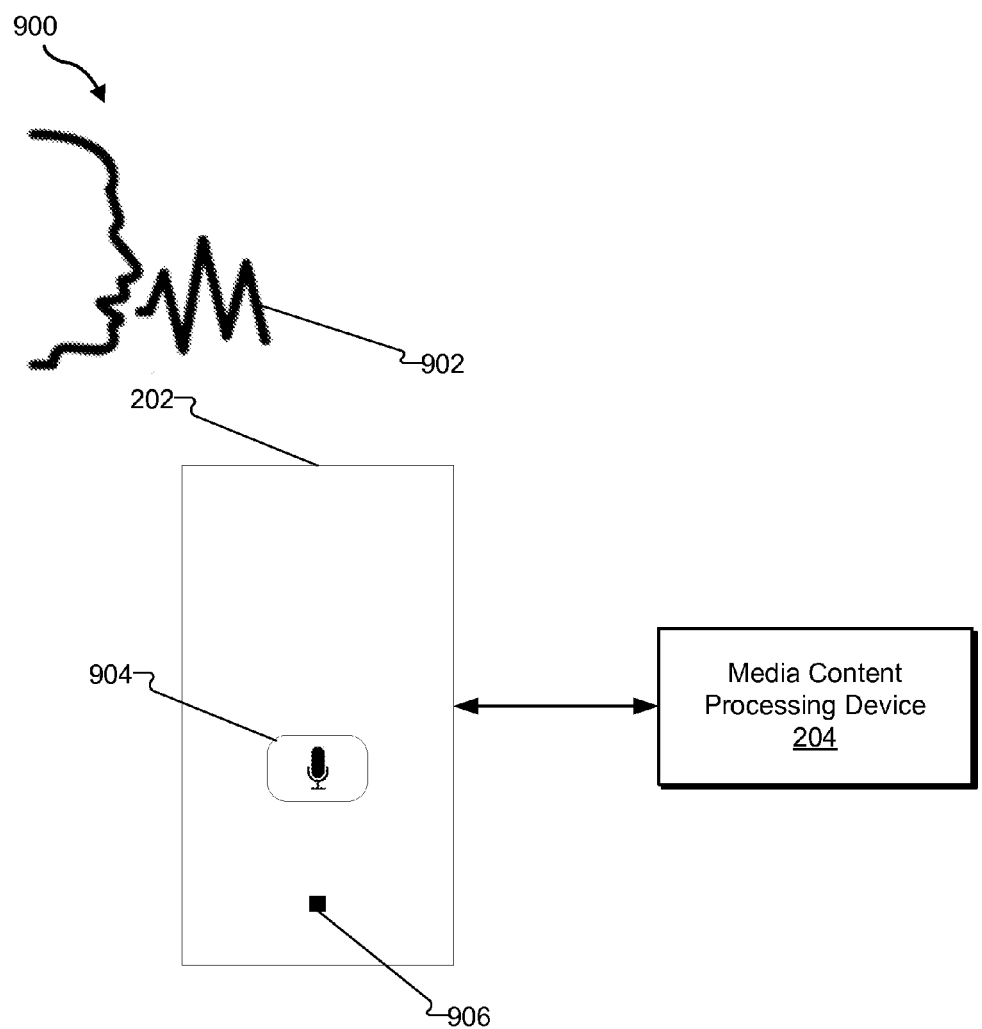
FIG. 9 illustrates an exemplary implementation showing voice control of a remote control device according to principles described herein.

To illustrate an example, FIG. 9 shows an exemplary implementation 900 in which a user enters a voice command 902 through remote control device 202. As shown in FIG. 9, remote control device 202 may include a microphone button 904 and a microphone 906. Through any suitable user input associated with microphone button 904, management facility 102 may initiate a listening mode during which management facility 102 may detect voice command 902 by utilizing microphone 906. For example, the user may enter any suitable user input through microphone button 904 and say "I am in the kitchen" as voice command 902. Management facility 102 may then compare the expression "I am in the kitchen" with the plurality of pre-defined voice commands in the voice command database and determine that the pre-defined action associated with that expression is to re-pair remote control device 202 with a processing device 204 that is in the kitchen of the user premises. Accordingly, management facility 102 may re-pair processing device 204 with remote control device 202 based on the voice command.

In another example, management facility 102 may prompt a user to provide a voice command when requesting a confirmation to re-pair a remote control device with another media content processing device. For example, voice command 902 illustrated in FIG. 9 may be associated with confirming re-pairing of remote control device 202 with processing device 204. Prior to management facility 102 re-pairing remote control device 202 with processing device 204, management facility 102 may provide a graphical user interface for display on a display screen associated with processing device 204. The graphical user interface may include any suitable content requesting that the user enter or say "yes" or "no" to confirm or decline the request. The user may then enter any suitable user input associated with microphone button 904 to cause management facility 102 to initiate a listening mode. Management facility 102 may then detect voice command 902 through microphone 906 and either facilitate or prevent the re-pairing based on whether the user says "yes" or "no."

In the examples described above with respect to FIG. 9, management facility 102 detects voice command 902 after detecting a user input associated with microphone button 904. However, in certain examples, management facility 102 may detect a voice command automatically through microphone 906 without the user having to enter a user input associated with microphone button 904 or any other button provided on remote control device 202. For example, management facility 102 may continually monitor audio signals detected by microphone 906 for pre-defined voice commands included in the voice command database. When management facility 102 identifies a pre-defined voice command, management facility 102 may either automatically perform a pre-defined action based on the identified voice command or may request confirmation from the user prior to performing the pre-defined action.

Figure 10:
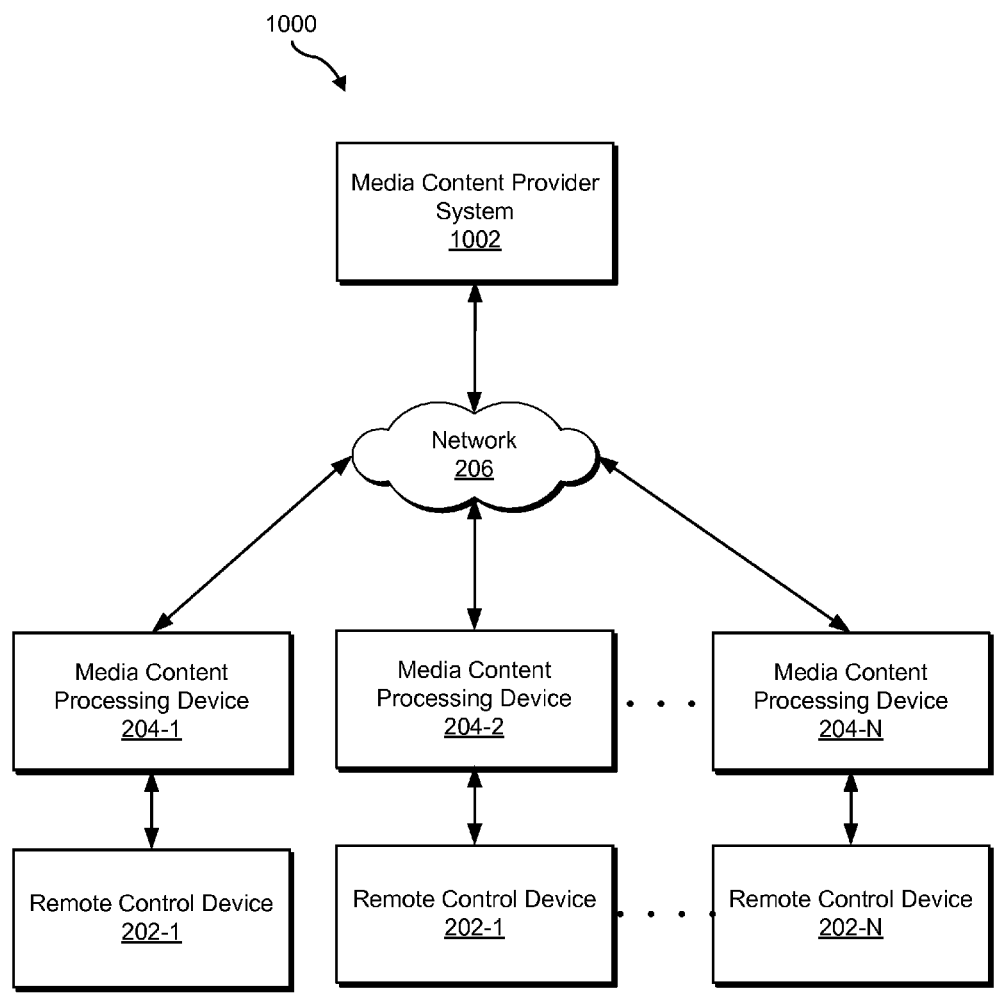
FIG. 10 illustrates another exemplary implementation of the system of FIG. 1 according to principles described herein.

FIG. 10 illustrates an exemplary implementation 1000 of system 100 wherein a media content provider system 1002 is communicatively coupled to processing devices 204 by way of network 206 and processing devices 204 are communicatively coupled to remote control devices 202. Management facility 102 and storage facility 104 may each be implemented by media content provider system 1002, one or more of remote control devices 202, and/or one or more of processing devices 204. Accordingly, in certain embodiments, components of system 100 may be implemented entirely by media content provider system 1002, by remote control devices 202, or by one or more of processing devices 204. In other embodiments, components of system 100 may be distributed across media content provider system 1002, remote control devices 202, and processing devices 204.

Media content provider system 1002 may be associated with a service provider (e.g., a subscriber television service provider, an Internet service provider, etc.), a media content program provider (e.g., ESPN, NBC, etc.), and/or any other type of media content provider. Accordingly, media content provider system 1002 may be configured to provide one or more media content services (e.g., television services, video-on-demand services, Internet services, application services, etc.) to processing devices 204. For example, media content provider system 1002 may be configured to manage (e.g., maintain, process, distribute, and/or generate) media content (e.g., media content programs, advertisements, etc.) configured to be delivered to processing devices 204. Media content provider system 1002 may be implemented by one or more computing devices as may serve a particular implementation.

Additionally or alternatively, media content provider system 1002 may be implemented by one or more third party servers configured to manage recommended media content, interface with one or more social media service provider subsystems, and/or perform any other operation associated with the methods and systems described herein.

Processing devices 204 may facilitate access by a user to content (e.g., media content) provided by media content provider system 1002. For example, processing devices 204 may be configured to perform one or more access events at the direction of a user. To illustrate, processing devices 204 may present and/or record a media program at the direction of a user.

Processing devices 204 may include one or more user computing devices associated with a user. Examples of such devices include, without limitation, any of the computing devices described herein. Processing devices 204 and remote control devices 202 may communicate in any suitable manner, such as described herein.

Media content provider system 1002 and processing devices 204 may communicate using any communication platforms and technologies suitable for transporting data (e.g., media programs data) and/or communication signals, including known communication technologies, devices, media, and protocols supportive of remote communications, examples of which include, but are not limited to, data transmission media, communications devices, Transmission Control Protocol ("TCP"), Internet Protocol ("IP"), Hypertext Transfer Protocol ("HTTP"), Hypertext Transfer Protocol Secure ("HTTPS"), Session Initiation Protocol ("SIP"), Simple Object Access Protocol ("SOAP"), Extensible Markup Language ("XML") and variations thereof, Real-Time Transport Protocol ("RTP"), User Datagram Protocol ("UDP"), Global System for Mobile Communications ("GSM") technologies, Code Division Multiple Access ("CDMA") technologies, Time Division Multiple Access ("TDMA") technologies, Short Message Service ("SMS"), Multimedia Message Service ("MMS"), RF signaling technologies, wireless communication technologies, Internet communication technologies, media streaming technologies, media download technologies, and other suitable communications technologies.

In certain embodiments, media content provider system 1002 and processing devices 204 may communicate via network 206. Network 206 may include one or more networks, such as one or more wireless networks (Wi-Fi networks), wireless communication networks, mobile telephone networks (e.g., cellular telephone networks), closed media networks, open media networks, closed communication networks, open communication networks, wide area networks (e.g., the Internet), local area networks, and any other networks capable of carrying data (e.g., streaming and/or downloading media programs) and/or communications signals between media content provider system 1002 and processing devices 204. Communications between media content provider system 1002 and processing devices 204 may be transported using any one of the above-listed networks, or any combination or sub-combination of the above-listed networks. Alternatively, media content provider system 1002 and processing devices 204 may communicate in another way such as by direct connections between media content provider system 1002 and processing devices 204.

Figure 11:
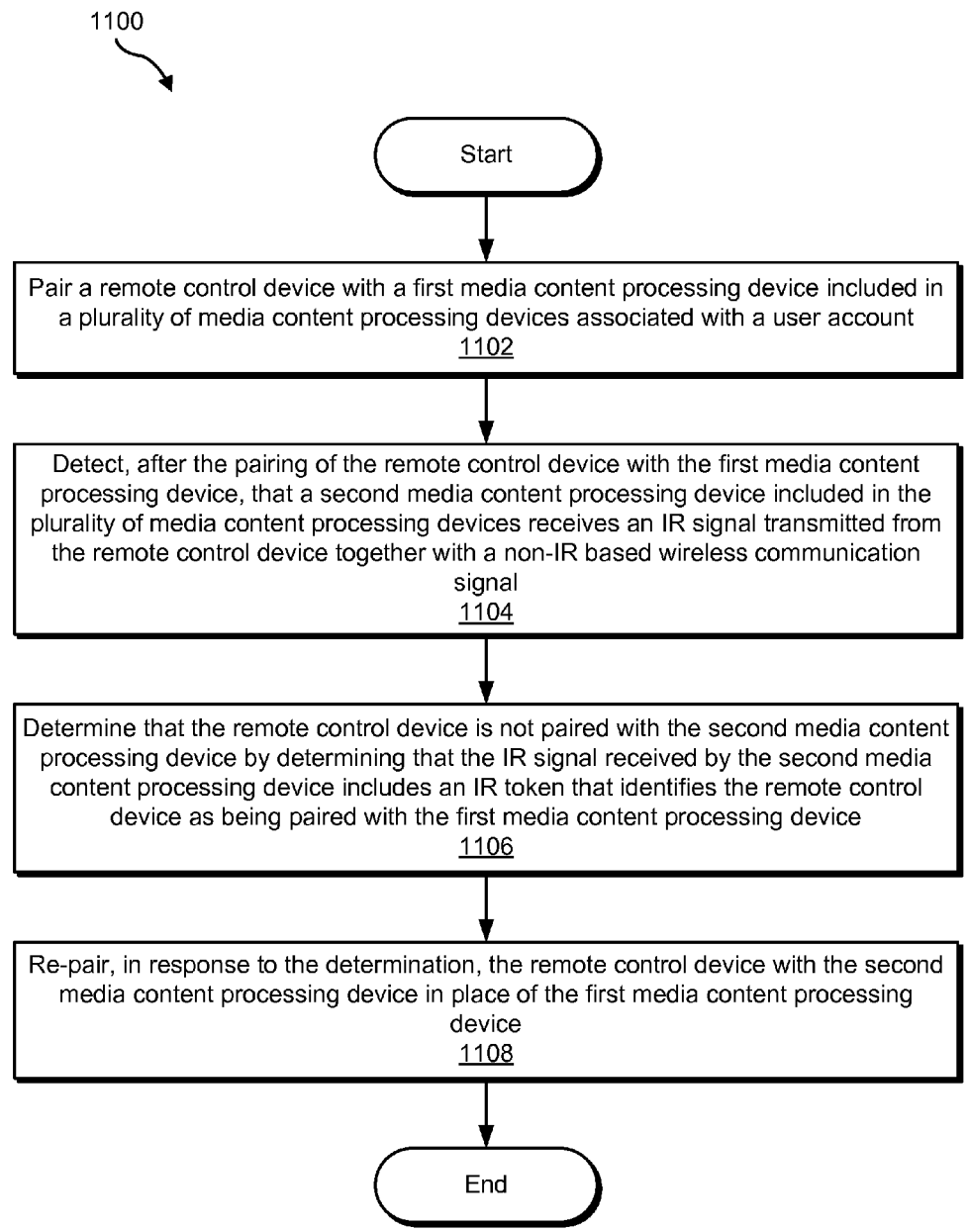
FIGS. 11-12 illustrate exemplary methods for managing pairing of remote control devices with a plurality of media content processing devices according to principles described herein.

FIG. 11 illustrates an exemplary method 1100 for managing pairing of remote control devices with a plurality of media content processing devices according to principles described herein. While FIG. 11 illustrates exemplary steps according to certain embodiments, other embodiments may omit, add to, reorder, combine, and/or modify any of the steps shown in FIG. 11. In certain embodiments, one or more of the steps shown in FIG. 11 may be performed by system 100 and/or one or more components or implementations of system 100.

In step 1102, a system (e.g., system 100) pairs a remote control device with a first media content processing device included in a plurality of media content processing devices associated with a user account. The remote control device may be configured to control media content processing devices with non-infrared-based ("non-IR-based") wireless communication signals. The pairing may comprise providing the remote control device with an infrared token ("IR token") that identifies the remote control device as being paired with the first media content processing device and that is to be transmitted by the remote control device within an infrared signal ("IR signal") each time the remote control device transmits a non-IR-based wireless communication signal. Step 1102 may be performed in any of the ways described herein.

In step 1104, the system detects, after the pairing of the remote control device with the first media content processing device, that a second media content processing device included in the plurality of media content processing devices receives an IR signal transmitted from the remote control device together with a non-IR based wireless communication signal. Step 1104 may be performed in any of the ways described herein.

In step 1106, the system determines that the remote control device is not paired with the second media content processing device. As described above, the system may make such a determination by determining that the IR signal received by the second media content processing device includes the IR token that identifies the remote control device as being paired with the first media content processing device. Step 1106 may be performed in any of the ways described herein.

In step 1108, the system re-pairs, in response to the determination, the remote control device with the second media content processing device in place of the first media content processing device. Step 1108 may be performed in any of the ways described herein.

Figure 12:
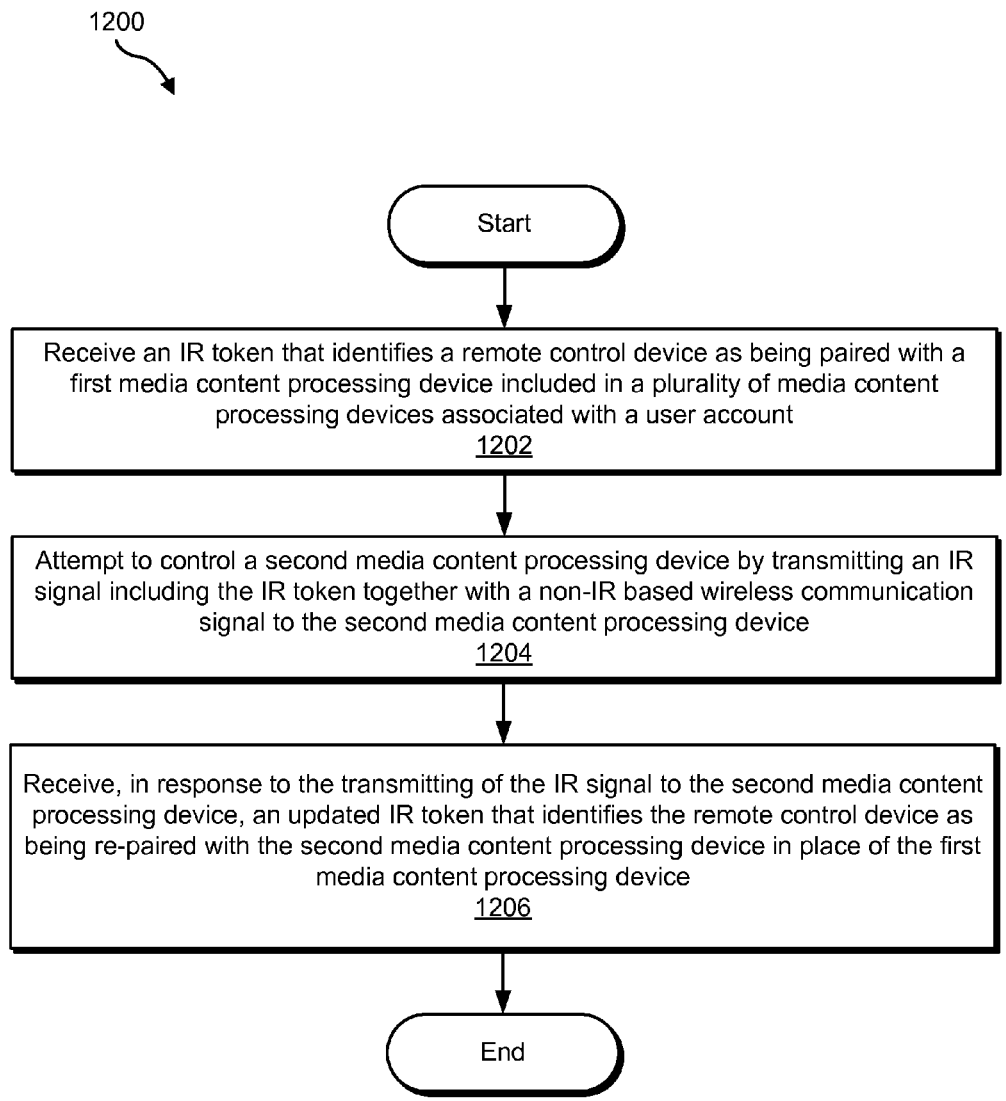

FIG. 12 illustrates an exemplary method 1200 for managing pairing of remote control devices with a plurality of media content processing devices according to principles described herein. While FIG. 12 illustrates exemplary steps according to certain embodiments, other embodiments may omit, add to, reorder, combine, and/or modify any of the steps shown in FIG. 12. In certain embodiments, one or more of the steps shown in FIG. 12 may be performed by a remote control device (e.g., any of remote control devices 202).

In step 1202, a remote control device receives an IR token that identifies the remote control device as being paired with a first media content processing device included in a plurality of media content processing devices associated with a user account. Step 1202 may be performed in any of the ways described herein.

In step 1204, the remote control device, after being paired with the first media content processing device, attempts to control a second media content processing device. This may be accomplished in any suitable manner. For example, the remote control device may transmit the IR signal including the IR token together with the non-IR based wireless communication signal to the second media content processing device. Step 1204 may be performed in any of the ways described herein.

In step 1206, the remote control device receives, in response to the transmitting of the IR signal to the second media content processing device, an updated IR token that identifies the remote control device as being re-paired with the second media content processing device in place of the first media content processing device. Step 1206 may be performed in any of the ways described herein.

In certain embodiments, one or more of the components and/or processes described herein may be implemented and/or performed by one or more appropriately configured computing devices. To this end, one or more of the systems and/or components described above may include or be implemented as one or more computing systems and/or components by any computer hardware, computer-implemented instructions (e.g., software) embodied in a non-transitory computer-readable medium, or combinations of computer-implemented instructions and hardware, configured to execute one or more of the processes described herein. In particular, system components may be implemented on one physical computing device or may be implemented on more than one physical computing device. Accordingly, system components may include any number of physical computing devices, and may employ any of a number of computer operating systems.

In certain embodiments, one or more of the processes described herein may be implemented at least in part as instructions embodied in a non-transitory computer-readable medium and executable by one or more computing devices. In general, a processor (e.g., a microprocessor) receives instructions, from a non-transitory computer-readable medium, (e.g., a memory, etc.), and executes those instructions, thereby performing one or more processes, including one or more of the processes described herein. Such instructions may be stored and/or transmitted using any of a variety of known computer-readable media.

A computer-readable medium (also referred to as a processor-readable medium) includes any non-transitory medium that participates in providing data (e.g., instructions) that may be read by a computer (e.g., by a processor of a computer). Such a medium may take many forms, including, but not limited to, non-volatile media and/or volatile media. Non-volatile media may include, for example, optical or magnetic disks and other persistent memory. Volatile media may include, for example, dynamic random access memory (DRAM), which typically constitutes a main memory. Common forms of computer-readable media include, for example, a floppy disk, flexible disk, hard disk, magnetic tape, any other magnetic medium, a Compact Disc Read-Only Memory (CD-ROM), DVD, any other optical medium, a Random-Access Memory (RAM), a Programmable ROM (PROM), an Erasable PROM (EPROM), a Flash Electrically EPROM (FLASH-EEPROM), any other memory chip or cartridge, or any other tangible medium from which a computer may read.

Figure 13:
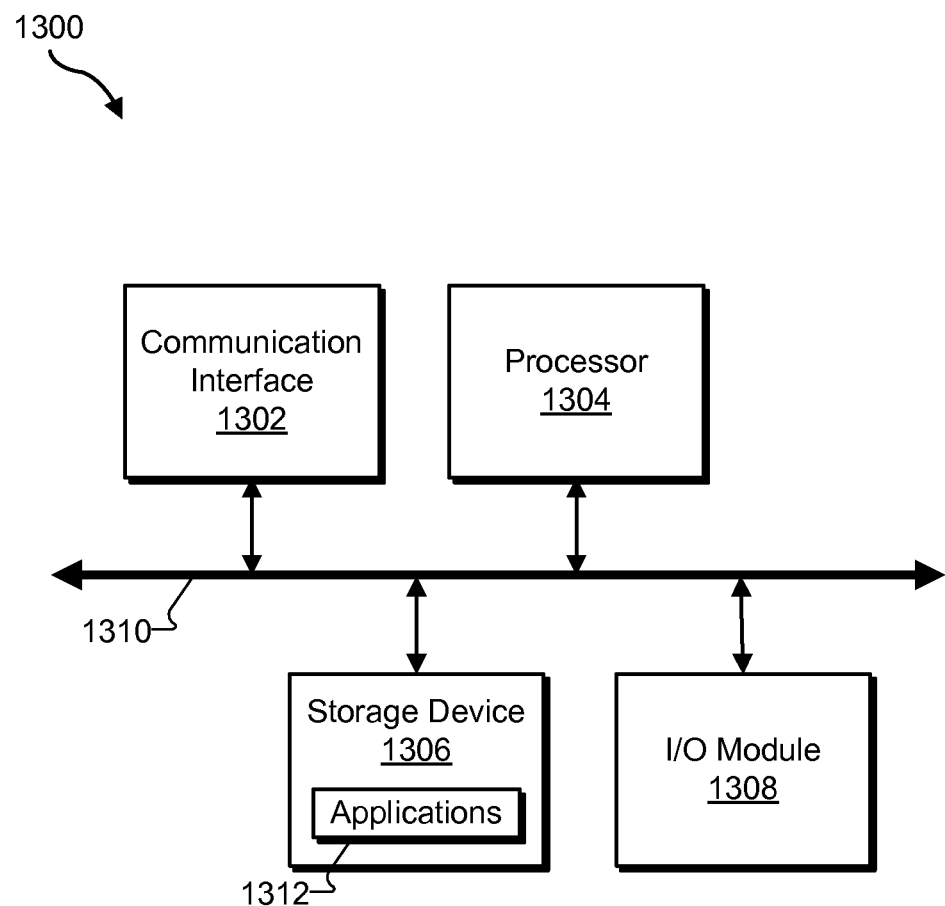
FIG. 13 illustrates an exemplary computing device according to principles described herein.

FIG. 13 illustrates an exemplary computing device 1300 that may be configured to perform one or more of the processes described herein. As shown in FIG. 13, computing device 1300 may include a communication interface 1302, a processor 1304, a storage device 1306, and an input/output (I/O) module 1308 communicatively connected via a communication infrastructure 1310. While an exemplary computing device 1300 is shown in FIG. 13, the components illustrated in FIG. 13 are not intended to be limiting. Additional or alternative components may be used in other embodiments. For example, in addition or alternative to being communicatively connected by way of communication infrastructure 1310, one or more components of computing device 1300 may be communicatively connected by way of one or more other suitable interfaces. For instance, communication interface 1302, storage device 1306, I/O module 1308, and/or any other components of computing device 1300 may be communicatively coupled directly to processor 1304 via one or more interfaces (e.g., discrete interfaces). Components of computing device 1300 shown in FIG. 13 will now be described in additional detail.

Communication interface 1302 may be configured to communicate with one or more computing devices. Examples of communication interface 1302 include, without limitation, a wired network interface (such as a network interface card), a wireless network interface (such as a wireless network interface card), a modem, and any other suitable interface. In at least one embodiment, communication interface 1302 may provide a direct connection between system 100 and one or more of provisioning systems via a direct link to a network, such as the Internet. Communication interface 1302 may additionally or alternatively provide such a connection through, for example, a local area network (such as an Ethernet network), a personal area network, a telephone or cable network, a satellite data connection, a dedicated URL, or any other suitable connection. Communication interface 1302 may be configured to interface with any suitable communication media, protocols, and formats, including any of those mentioned above.

Processor 1304 generally represents any type or form of processing unit capable of processing data or interpreting, executing, and/or directing execution of one or more of the instructions, processes, and/or operations described herein. Processor 1304 may direct execution of operations in accordance with one or more applications 1312 or other computer-executable instructions such as may be stored in storage device 1306 or another computer-readable medium.

Storage device 1306 may include one or more data storage media, devices, or configurations and may employ any type, form, and combination of data storage media and/or device. For example, storage device 1306 may include, but is not limited to, a hard drive, network drive, flash drive, magnetic disc, optical disc, RAM, DRAM, other non-volatile and/or volatile data storage units, or a combination or sub-combination thereof. Electronic data, including data described herein, may be temporarily and/or permanently stored in storage device 1306. For example, data representative of one or more executable applications 1312 (which may include, but are not limited to, one or more of the software applications described herein) configured to direct processor 1304 to perform any of the operations described herein may be stored within storage device 1306. In some examples, data may be arranged in one or more databases residing within storage device 1306.

I/O module 1308 may be configured to receive user input and provide user output and may include any hardware, firmware, software, or combination thereof supportive of input and output capabilities. For example, I/O module 1308 may include hardware and/or software for capturing user input, including, but not limited to, a keyboard or keypad, a touch screen component (e.g., touch screen display), a receiver (e.g., an RF or infrared receiver), and/or one or more input buttons.

I/O module 1308 may include one or more devices for presenting output to a user, including, but not limited to, a graphics engine, a display (e.g., a display screen), one or more output drivers (e.g., display drivers), one or more audio speakers, and one or more audio drivers. In certain embodiments, I/O module 1308 is configured to provide graphical data to a display for presentation to a user. The graphical data may be representative of one or more graphical user interfaces and/or any other graphical content as may serve a particular implementation.

In some examples, any of the systems and/or facilities described herein may be implemented by or within one or more components of computing device 1300. For example, one or more applications 1312 residing within storage device 1306 may be configured to direct processor 1304 to perform one or more processes or functions associated with system 100 or any components thereof.

To the extent the aforementioned embodiments collect, store, and/or employ personal information provided by individuals (or other entities), it should be understood that such information shall be used in accordance with all applicable laws concerning protection of personal information. Additionally, the collection, storage, and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

In the preceding description, various exemplary embodiments have been described with reference to the accompanying drawings. It will, however, be evident that various modifications and changes may be made thereto, and additional embodiments may be implemented, without departing from the scope of the invention as set forth in the claims that follow. For example, certain features of one embodiment described herein may be combined with or substituted for features of another embodiment described herein. The description and drawings are accordingly to be regarded in an illustrative rather than a restrictive sense.

What is claimed is:

1. A method comprising:

pairing, by a remote control device management system, a remote control device with a first media content processing device included in a plurality of media content processing devices, the remote control device configured to control media content processing devices with non-infrared-based ("non-IR-based") wireless communication signals, the pairing comprising providing the remote control device with an infrared token ("IR token") that identifies the remote control device as being paired with the first media content processing device and that is to be transmitted by the remote control device within an infrared signal ("IR signal") each time the remote control device transmits a non-IR-based wireless communication signal;

detecting, by the remote control device management system after the pairing of the remote control device with the first media content processing device, that a second media content processing device included in the plurality of media content processing devices receives the IR signal transmitted from the remote control device together with the non-IR based wireless communication signal, wherein
the IR signal includes the IR token but does not include a command associated with an attempt of a user to control the second media content processing device, and
the non-IR based wireless communication signal includes the command associated with the attempt of the user to control the second media content processing device;

determining, by the remote control device management system, that the remote control device is not paired with the second media content processing device by determining that the IR signal received by the second media content processing device includes the IR token that identifies the remote control device as being paired with the first media content processing device; and re-pairing, by the remote control device management system in response to the determination, the remote control device with the second media content processing device in place of the first media content processing device.

2. The method of claim 1, wherein the IR token is provided to the remote control device by way of an additional non-IR-based wireless communication signal transmitted from the first media content processing device.

3. The method of claim 1, wherein the pairing of the remote control device with the first media content processing device includes providing the remote control device with coding information used to identify and control a display device communicatively coupled to the first media content processing device.

4. The method of claim 1, wherein the re-pairing of the remote control device with the second media content processing device includes providing an updated IR token to the remote control device that identifies the remote control device as being paired with the second media content processing device.

5. The method of claim 1, wherein the re-pairing of the remote control device with the second media content processing device is transparent to the user of the remote control device.

6. The method of claim 1, further comprising:

requesting, by the remote control device management system, confirmation from the user of the remote control device prior to the re-pairing of the remote control device with the second media content processing device;

receiving, by the remote control device management system, the confirmation provided by the user; and performing, by the remote control device management system, the re-pairing of the remote control device with the second media content processing device in response to the user providing the confirmation.

7. The method of claim 1, further comprising:

blocking, by the remote control device management system in response to the detecting that the second media content processing device receives the IR signal, the first media content processing device from executing the command included in the non-IR based wireless communication signal transmitted from the remote control device; and facilitating, by the remote control device management system subsequent to the re-pairing of the remote control device with the second media content processing device, execution of the command by the second media content processing device.

8. The method of claim 7, wherein the facilitating of the execution of the command includes directing, by the remote control device management system, the first media content processing device to transmit the command to the second media content processing device.

9. The method of claim 7, wherein the facilitating of the execution of the command includes directing, by the remote control device management system, the remote control device to retransmit the command to the second media content processing device.

10. The method of claim 1, embodied as computer-executable instructions on at least one non-transitory computer-readable medium.

11. A method comprising:

receiving, by a remote control device configured to control media content processing devices with non-infrared-based ("non-IR-based") wireless communication signals, an infrared token ("IR token") that identifies the remote control device as being paired with a first media content processing device included in a plurality of media content processing devices, the IR token configured to be transmitted by the remote control device within an infrared signal ("IR signal") each time the remote control device transmits a non-IR-based wireless communication signal;

attempting, by the remote control device after being paired with the first media content processing device, to control a second media content processing device by transmitting the IR signal including the IR token together with the non-IR based wireless communication signal to the second media content processing device, wherein
the IR signal includes the IR token but does not include a command associated with an attempt of a user to control the second media content processing device, and
the non-IR based wireless communication signal includes the command associated with the attempt of the user to control the second media content processing device; and receiving, by the remote control device in response to the transmitting of the IR signal to the second media content processing device, an updated IR token that identifies the remote control device as being re-paired with the second media content processing device in place of the first media content processing device.

12. The method of claim 11, further comprising automatically retransmitting, by the remote control device in response to the receiving of the updated IR token, the non-IR-based wireless communication signal without the user of the remote control device having to re-enter the command associated with the non-IR-based wireless communication signal.

13. A system comprising:
at least one physical computing device that
pairs a remote control device with a first media content processing device included in a plurality of media content processing devices, the remote control device configured to control media content processing devices with non-infrared-based ("non-IR-based") wireless communication signals, the pairing comprising providing the remote control device with an infrared token ("IR token") that identifies the remote control device as being paired with the first media content processing device and that is to be transmitted by the remote control device within an infrared signal ("IR signal") each time the remote control device transmits a non-IR-based wireless communication signal;
detects, after the pairing of the remote control device with the first media content processing device, that a second media content processing device included in the plurality of media content processing devices receives the IR signal transmitted from the remote control device together with the non-IR based wireless communication signal, wherein
the IR signal includes the IR token but does not include a command associated with an attempt of a user to control the second media content processing device, and
the non-IR based wireless communication signal includes the command associated with the attempt of the user to control the second media content processing device;
determines that the remote control device is not paired with the second media content processing device by determining that the IR signal received by the second media content processing device includes the IR token that identifies the remote control device as being paired with the first media content processing device; and
re-pairs, in response to the determination, the remote control device with the second media content processing device in place of the first media content processing device.

14. The system of claim 13, wherein the at least one physical computing device re-pairs the remote control device with the second media content processing device in part by providing an updated IR token to the remote control device that identifies the remote control device as being paired with the second media content processing device.

15. The system of claim 13, wherein the at least one physical computing device further:
detects a voice command of the user of the remote control device after the re-pairing of the remote control device with the second media content processing device; and
directs the second media content processing device to perform a remote control operation based on the voice command.

16. The system of claim 15, wherein the at least one physical computing device detects the voice command by utilizing a microphone of the remote control device.

17. The system of claim 15, wherein the at least one physical computing device detects the voice command by:
accessing a database including a plurality of pre-defined voice commands; and
identifying the voice command by comparing the voice command to the plurality of pre-defined voice commands; and
wherein the at least one physical computing device directs the second media content processing device to perform the remote control operation by executing a pre-defined action based on the identified voice command.

18. The system of claim 17, wherein the pre-defined action comprises re-pairing the remote control device with a third media content processing device in place of the second media content processing device.

19. The system of claim 13, wherein, after the at least one physical computing device re-pairs the remote control device with the second media content processing device, the at least one physical computing device further directs the first media content processing device to transmit the non-IR-based wireless communication signal to the second media content processing device.

20. The system of claim 13, wherein, after the at least one physical computing device re-pairs the remote control device with the second media content processing device, the at least one physical computing device further directs the remote control device to automatically retransmit the non-IR-based wireless communication signal to the second media content processing device.

* * * * *